Feb. 6, 1968  W. H. PALMER  3,368,007
ROTARY DIE EXTRUDER SYSTEM
Original Filed Sept. 18, 1963  2 Sheets-Sheet 1

Inventor
William H. Palmer
By Charles M. Hutchins
ATTORNEY

United States Patent Office 3,368,007
Patented Feb. 6, 1968

3,368,007
ROTARY DIE EXTRUDER SYSTEM
William H. Palmer, Columbus, Ohio, assignor to Industrial Nucleonics Corporation, a corporation of Ohio
Continuation of application Ser. No. 309,631, Sept. 18, 1963. This application Nov. 21, 1966, Ser. No. 596,002
18 Claims. (Cl. 264—40)

ABSTRACT OF THE DISCLOSURE

The single thickness profile of the flattened output from a blown film extruder where the extruder die rotates to distribute thickness variations circumferentially about the film is obtained from a measurement of the double sheet thickness at such a position immediately adjacent the edge of the film that the output of each profile forming portion of the extruder die can be obtained. The average sheet thickness is determined by integrating the single thickness profile measurement for a time period equal to the period of revolution of the extruder die, as determined by electro-mechanical timers.

Cross reference to related application

This application is a continuation of application Ser. No. 309,631, filed Sept. 18, 1963, now abandoned, entitled, Rotary Die Extruder System.

This invention relates generally to plastic extruders of the blown film type and more specifically to a method and means for measuring and controlling the output of a rotary die extruder.

The plastics industry has used many types of extruders to obtain a sheet of material. In most of these extruders, material to be formed is dumped into a hopper and heated in the extruder until it becomes deformable. A motor driven screw forces the material through a die. After leaving the die the material cools and hardens in the air and a take-away conveyor mechanism removes the formed material.

There seem to be two principal methods used to provide an output in sheet form. One method is to use a flat die having a plurality of adjustable die bolts spaced in line across the width of the sheet emerging from the die orifice. The other is to use an annular die with adjustable die bolts mounted on the periphery and extending radially from the core around the circular orifice. Air is forced through the center of the die to blow the extruded plastic into a thin walled bubble. Pinch rolls flatten the bubble into a sheet of double thickness after which it is slit to provide a wide sheet of the required thickness. To eliminate heavy or light streaks from the produced sheet it has been found expedient to rotate the die, the bubble, or, in some cases, even the extruder. If one or more die bolts are misadjusted, the strips or zones of objectionable thickness spiral around and do not cause a pile-up of material at any particular spot on the windup roll.

It is of economic importance to produce a sheet having a uniform desired thickness. In systems using the linear die technique, a scanning radiation gauge has been used to measure cross-sheet thickness and control has been exerted on screw speed and take-away speed in accordance with said thickness information. This method is described in U.S. Patent 3,015,129 issued January 2, 1962, to W. C. Hays et al. and assigned to the same assignee as the present invention. This approach is impractical in the rotating extrusion process described above because scanning yields only a combined double thickness profile. It is conceivable that a high and a low spot may coincide to produce a double thickness that is twice the desired thickness.

In accordance with the present invention, a thickness measurement is performed at the edge of the flattened bubble by a stationary radiation gauge. While the thickness profile is actually a double one, by virtue of the location of the point of measurement, it is taken substantially at a single point, i.e., the thickness thereat is determined by only one peripheral die section, and the true sheet thickness is exactly half of the measured value. As the die element rotates it will thus be clear that over the period of a complete rotation, the true double thickness output of each adjustable peripheral die section in succession will be obtainable. The measured profile is averaged over a period of time equal to the time for one rotation of the die. Both the measured profile and the time average values are read out on a chart recorder in a convenient form easily interpreted by operating personnel.

Accordingly, it is a primary object of the present invention to provide a method and means for measuring the output of a rotating die extruder.

It is another object of the present invention to provide a gauging system for a plastic sheet forming process that is simpler in operation and less expensive to manufacture than similar devices used heretofore.

It is still another object of the present invention to provide a gauging system for a rotating die extruder that presents process information in a form convenient for the use of operating personnel responsible for controlling the extruder.

Summarizing, it can be stated that the present invention provides a novel method of deriving output information of a rotating die extruding process and presenting said information in a form convenient for use by operating personnel. Other features and advantages of the present invention will become more apparent upon reference to the following description when taken in conjunction with the appended drawings in which.

Figure 1:
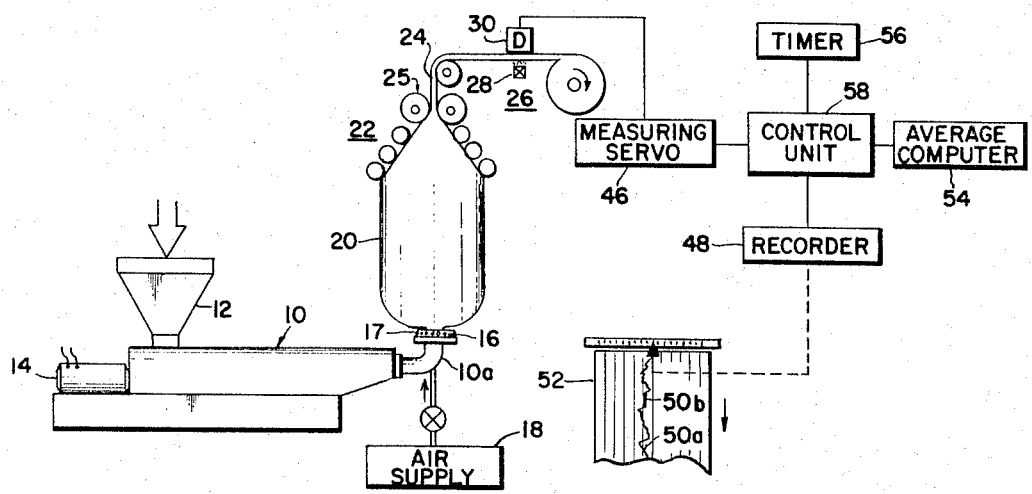
FIG. 1 is a block diagram showing a plastic extrusion process and a measuring and recording system applied thereto in accordance with the present invention.
Figure 2:
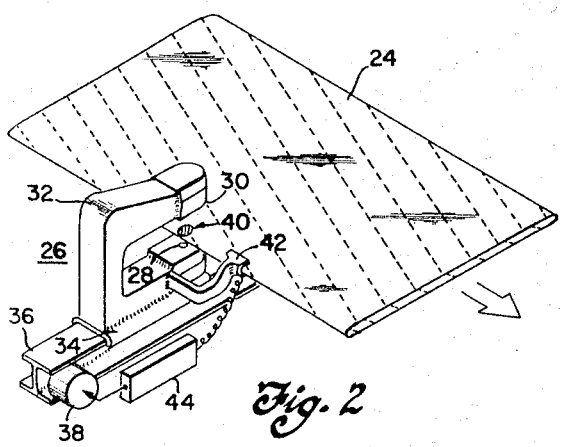
FIG. 2 is an enlarged perspective view of a portion of the process shown in FIG. 1 showing radiation gauging apparatus that is of particular utility in this invention.

With specific reference to FIGS. 1 and 2, a portion of a plastic sheet-forming process is illustrated as a particular application of the present invention. An extruder 10 receives raw material in a hopper 12. A motor 14 drives a screw (not shown), forcing the material down the extruder and out a rotating die member 16 provided on the end of an upturned neck 10a of the extruder. A plurality of adjustable die bolts 17 extend radially from the center of the die 16 and serve to vary the spacing of peripheral die sections from the core of the die. Air from a supply 18 is blown through the center of the die 16 and serves to expand the extruded material into a bubble 20. A series of pinch rolls 22 squeeze the upper end of the bubble 20 thereby producing a flat sheet 24 of double thickness. The doubled sheet is drawn by a pair of take-away rolls 25 and is subsequently slit and collected on windup reels (not shown).

For purposes of inventory and providing an economic operation, it is necessary for operating and plant personnel to know how much the produced sheet varies in thickness. To provide some indication of this variation, the present invention provides a radiation gauge 26 comprising a radiation source 28 and a detector 30. The gauge 26 operates on the principle of radiation absorption in which the detected radiation is a function of absorber thickness. For a more detailed description of the gauge 26, reference may be had to U.S. Patent 2,790,945, issued April 30, 1957, to H. R. Chope and assigned to the assignee of record. In a preferred embodiment of my invention, the gauge 26 is mounted at the extreme edge of the flattened bubble 24 as it emerges from the pinch rolls 22.

The placement of the gauge 26 and the reasons therefor become apparent upon reference to FIG. 2. Referring briefly to FIG. 2, the gauge 26 comprises a U-bracket 32 having a lower and an upper arm for housing the source and detector elements 28 and 30. The bracket is mounted on a carriage 34 movable along a rail 36 by means of a motor 38. The gauge 26 effectively measures an area 40 which may be circular, ellipsoidal or rectangular depending on the source geometry employed.

The flattened bubble can be pictured as having a plurality of longitudinally spiralling zones, each having a thickness determined by one of the adjustable die sections of the rotatable die 16. The pitch of the spiralling zones depends on both the rotational velocity of the die member 16 and the take-away speed of the conveyor mechanism. Under these conditions, a single point measurement can be provided only by measuring at the edge of the sheet. A measurement made at the center of the sheet necessarily involves two widely separated areas on the sheet when it is opened up. A scanning gauge, for example, as shown in the Hays reference supra, has little utility here due to the manner in which the sheet is formed. It is apparent to those skilled in the art that the measuring area cannot be allowed to extend beyond the edge of the sheet because then some direct radiation from the source will strike the detector. To enable the gauge 26 to see a strip always located on the sheet, a simple edge-sensing device and control may be provided as indicated by the reference numerals 42 and 44. Sheet edge followers are well known to those skilled in the art so no further discussion of unit 42 is presented here. Control unit 44 actuates the drive motor 38 to continuously position the carriage 34 to center the sheet edge in the air gap of the sensing unit 42.

Referring back to FIG. 1, the thickness-functional output of the radiation detector 30 is received by a measuring servo 46. The measuring servo drives a chart recorder 48 which records the profile information as a trace 50a on a moving chart 52. A profile-averaging computer 54 serves to integrate the thickness measurements of the radiation gauge 26. The output of the computer may be read out as a trace 50b following the profile trace 50a. A timer unit 56 determines the period of signal integration performed by the computer 54 which may be set for a duration equivalent to the time required for one revolution of the die 16. A control unit 58 provides the switching functions needed to display the derived process information.

Figure 3:
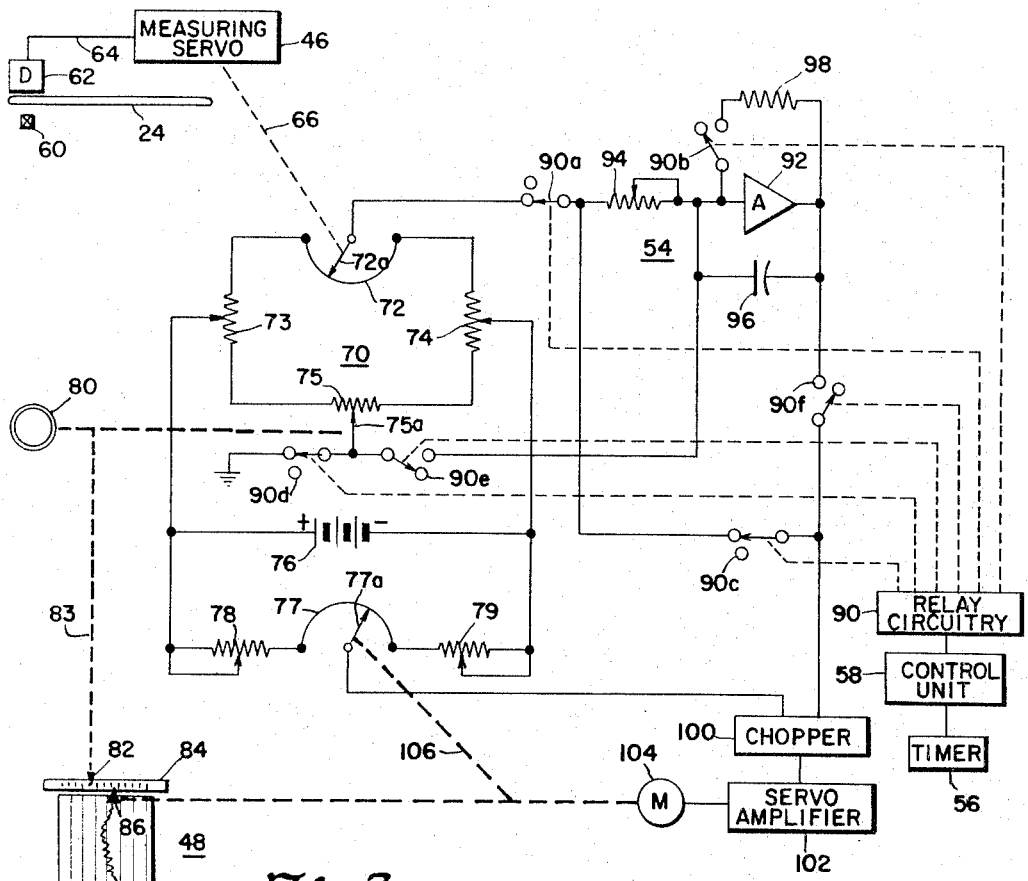
FIG. 3 is a circuit diagram of the measuring and recording system shown in FIG. 1.

While various circuits may be used to provide the required readout, a particularly useful circuit appears in FIG. 3.

A radioactive source 60 is disposed adjacent the edge of sheet 24 for directing radiant energy toward a detector 62 arranged on the opposite side of said sheet. A conductor 64 serves to deliver generated electrical signals to the measuring servo 46. A computer bridge 70 includes a repeat slidewire potentiometer 72 connected by means of potentiometers 73 and 74 to a target potentiometer 75, a source of bridge potential represented by the battery 76 connected to the adjustable taps of the potentiometers 73 and 74, a recorder slidewire 77, and a pair of potentiometers 78 and 79 serving to connect the recorder slidewire potentiometer 77 to the battery 76. The measuring servo 46 is mechanically coupled to the movable arm 72a of the repeat slidewire as indicated by the dotted line 66. The setting of the tap 75a of the target potentiometer is determined by a target adjust knob 80 which may be provided on the front panel of the recorder 48 for the convenience of operating personnel. A movable target indicator 82 is coupled to the knob 80 by the mechanical linkage indicated at 83. The indicator 82 may be manually positioned across a recorder scale 84 which may be suitably calibrated in units of mils thickness, for example.

Movable tap 72a of the repeat slidewire is electrically connected via a set of relay contacts 90a to the integrator 54. In a preferred form, integrator 54 comprises a stabilized operational amplifier 92 utilizing an inverse feedback principle, an input resistor 94, a capacitor 96 connected between the input and output terminals of said amplifier, and a resistor 98 adapted to shunt said capacitor when a set of relay contacts 90b are closed.

The adjustable tap 77a of the recorder slidewire is connected to one terminal of a D.C. chopper 100. The integrator 54 may be connected to another terminal of the chopper 100 by a set of relay contacts 90f. In a well-known manner, chopper 100 produces an alternating output having one of two directly opposite phases in accordance with the polarity of the D.C. potential existing across its input terminals. Circuitry generally shown at 102 serves to amplify the alternating output of the chopper 100. The output of amplifier 102 is in turn connected to a computer servomotor 104 which may be of the two phase type. The servomotor 104 may be geared to the movable arm 77a as shown by the heavy dotted line 106. In addition, it may be desirable to mechanically couple a recording indicator 86 of the recorder 48 to the servomotor 104 to provide visual indication of the position of the tap 77a on the recorder slidewire.

Figure 4:
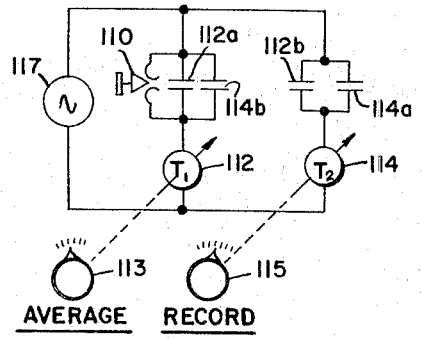
FIG. 4 is a functional circuit diagram of a timing apparatus useful in the system shown in FIG. 1.

The exemplary timing circuit of FIG. 4 is helpful in explaining the operation of the present invention and, in particular, the sequence of switching operations performed in the circuit of FIG. 3. The measured thickness variations are recorded on the moving chart and simultaneously averaged for the time $T_1$ required for one revolution of the die. The average thickness value is then presented for a time $T_2$ on the chart. This sequence can be repeated as often as necessary by means of an initiate switch 110. The aforesaid time periods are determined by timers 112, 114 that can be connected across a source or A.C. supply 117. The timers may be of the electromechanical type such as that manufactured by Microflex Corporation and sold under the name of "Eagle Timers." Timer 112 controls the time of integration and may be manually adjustable by means of a knob 113 to correspond to the speed of die rotation. As soon as switch 110 is depressed, timer 112 starts and locks itself on by means of its auxiliary contacts 112a. During this time, relay contacts 90c in FIG. 3 connect the chopper between the slidewire arms 72a and 77a to permit the marking indicator 86 to follow the output of the measuring servo 46. Contacts 90d ground the arm 75a of the target potentiometer to enable the integrator 54 to average the difference between the measured and the desired thickness values.

When the die 16 has made one revolution, timer 112 "times out" and contacts 112b energize timer 114 whose "on time" interval may be adjustable by means of a knob 115. In most cases the recorded average is presented for a period of time $T_2$ much less than the averaging time $T_1$. Timer 114 is locked on by contacts 114a. Contacts 90a and 90c in FIG. 3 open to disconnect the repeat slidewire from the integrator input and from the chopper 100 respectively. Contacts 90d open to lift the target arm 75a from ground. Contacts 90e and 90f close to couple the integrator output into the recorder bridge 70. Therefore, a line is drawn on the chart in accordance with the voltage appearing across the capacitor 96. When timer 114 times out, contacts 90b serve to reset the integrator 54, the initial switch states are established, and contacts 114b start the sequence again by energizing timer 112. It may be desirable to eliminate the automatic recycling feature and use only manual demand operation via the switch 110.

It is apparent that the techniques of the present invention may be applied with equal utility to plastic extruders in which the die is rotated through some angle less than 360 degrees and counterrotated through the same angle. For example, if an oscillatory motion of 180 degrees is used, a gauge may be mounted at each edge of the sheet to provide complete information of profile.

Figure 6:
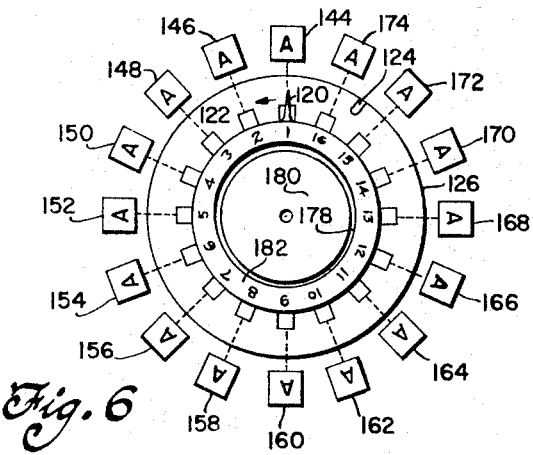
FIG. 6 is a top view of the extruder die showing means for actuating the die adjustments.
Figure 7:
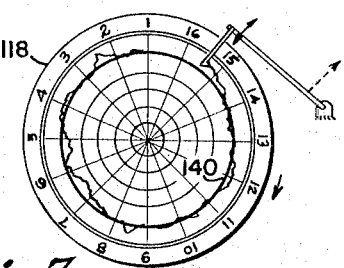
FIG. 7 is a view of a preferred circular chart useful in facilitating the die adjustment illustrated in FIG. 6.
Figure 5:
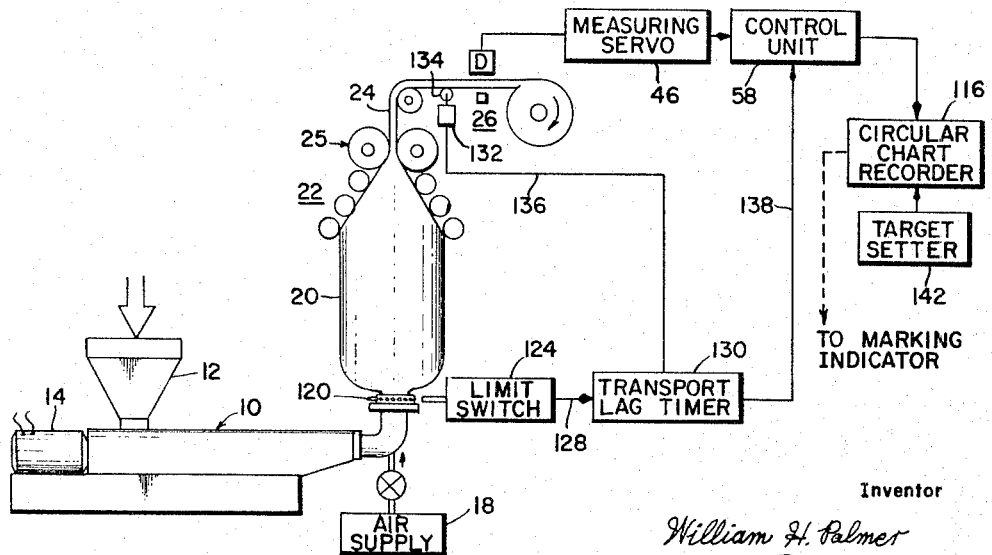
FIG. 5 is a block diagram of an alternate construction of the present invention which correlates the recorder presentation with the rotation of the die.

While a single rotation average over any $2\pi$ segment of the die 16 provides enough information for manual or automatic control of profile, it is highly desirable to correlate the measured and recorded points of profile with the controlling die section. Referring now to FIGS. 5, 6 and 7, most of the blocks are the same except that a circular chart recorder 116 is preferable in place of the strip chart recorder 48. The recorder 116 provides the circular record 118 with the die sections numbered thereon as shown. It is suggested herein to mount an actuating pin 120 on the rotating member 122 and a switch 124 on the stationary extruder periphery 126 to provide a pulse on line 128 once any die section, #1 for example, passes the switch 124. Since it takes a finite amount of time for the material to pass from the die to the point of profile measurement after the take-away rolls 25, a transport lag timer 130 delays the indexing information from the switch 124 to insure that the chart record is properly registered with respect to the profile data being measured. If the line speed is constant a timer can be used at 130 and manually set for the transportation time; however, if line speed varies, a footage counter would be used. In this case, a unit 132 having a wheel 134 in tractive engagement with the sheet 24 would, through a cam switch arrangement, pulse over line 136 a counter in the timer 130. After a preset number of pulses a suitable initiate signal is transmitted over line 138 to start the recording of profile information.

In the operation of this embodiment the profile information may be recorded as shown, starting with die section #1. Before the information on all 16 die sections, for example, has been recorded, it may be desirable to draw a target line 140 on the chart 118 so that deviations of the sheet from the desired value at each die section are readily apparent to the operator. Modifications of the circuitry of FIG. 3 suitable for switching the target setter 142 into the recorder will be apparent to those skilled in the art. Having this information, the operator can proceed to manually adjust the die bolts of each section as indicated by the actuator elements 144–174. The die bolts alter the spacing 178 between the core 180 of the die and the surrounding die block 182. Different methods of die control such as a zone heating may be used but the application of the teachings of the present invention as described hereinabove to these devices should be apparent. In addition, certain other refinements such as automatic control of profile will be obvious to those skilled in the art.

The advantages of the present invention should now be apparent. By measuring at the edge one obtains a true profile. By averaging the profile over one die rotation a significant figure of extruder output is obtained that is not the result of a complicated measurement. By correlating die position with the measuring and recording operation and by using a circular chart presentation on which the die sections are marked, a basis for control of the profile is readily obtained.

Although certain specific embodiments of the invention have been shown and described herein, many modifications may be made thereto without departing from the true spirit and scope of the invention as set forth in the appended claims.

I claim:
1. The method for measuring and recording the output of a blown film extruder receiving plastic material and having a rotatable circular die with means for forming a bubble of plastic film and means for flattening said bubble to form a sheet of double thickness, said method comprising the steps of:
measuring the variations in total sheet thickness at one edge of said flattened sheet to obtain a profile of a single thickness of said sheet; and
recording said measured profile on a permanent record.
2. The method for measuring and recording the output of a blown film extruder receiving plastic material and having a rotatable circular die with means for forming a bubble of plastic film and means for flattening said bubble to form a sheet of double thickness, said method comprising the steps of:
measuring the variations in total sheet thickness at one edge of said sheet to obtain a profile of a single thickness of said sheet,
recording said measured profile on a permanent record,
averaging said profile measurement over one rotation of said die, and
recording said average profile value on a permanent record.
3. The method of measuring the thickness of a tubular product formed by a device that can produce spiral variations about the circumference of said tubular product, and flattened to form a sheet of double thickness, said method comprising the steps of:
measuring the variations in total sheet thickness at one edge of said flattened sheet to obtain a profile of a single thickness of said sheet.
4. The method of measuring the output of a blown film extrusion process wherein an extruder having a rotatable forming member provides an expanded tubular product having spiral variations about the circumference of said tubular product and wherein said product is flattened into a sheet of double thickness by pinch roll means, said method comprising the steps of:
measuring the variations in total sheet thickness at one edge of said flattened sheet to obtain a profile of a single thickness of said sheet, and
averaging said total thickness measurement for a time period substantially equal to the rotation period of said forming member.
5. The method of measuring the output of a blown film extrusion process wherein a bubble of plastic material is formed by a forming member including a generally circular die having a plurality of adjustable peripheral die sections spaced therearound, wherein said forming member includes a rotatable part such that the thickness variations of the plastic material are distributed about the circumference of said bubble, and wherein said bubble is flattened to form a sheet of double thickness, said method comprising the steps of:
measuring the variations in double sheet thickness at a predetermined fixed operating position relative to, overlying, and so positioned immediately adjacent one edge of said flattened double thickness sheet that a measurement of the double thickness output of a single adjustable peripheral die section is obtainable; and
utilizing said measurement as an indication of the single sheet thickness profile of said plastic material to adjust said plurality of peripheral die sections and to maintain the single thickness profile of said plastic material within predetermined limits.
6. The method of claim 5 in which the true sheet thickness output of each adjustable peripheral die section is obtainable in succession during the rotation of said rotatable part.
7. The method of claim 5 further including the steps of:
averaging said single thickness profile measurement for a time period sufficient to allow at least one entire circumference of said material to be measured; and
utilizing said average of said single thickness profile to adjust said extruder in response thereto.

8. The method of measuring the output of a blown film extrusion process wherein a bubble of plastic material is formed by a forming member including a generally circular die having a plurality of adjustable peripheral die sections spaced therearound, wherein said forming member includes a rotatable part such that the thickness variations on the plastic material are distributed about the circumference of said bubble, and wherein said bubble is flattened to form a sheet of double thickness, said method comprising the steps of:

measuring the variations in double sheet thickness at a location overlying and immediately adjacent one edge of said flattened sheet;
averaging said total thickness measurement for a time period sufficient to allow at least one entire circumference of said material to be measured; and
utilizing said average of said total thickness measurement to adjust the extrusion process in response thereto to obtain a predetermined sheet thickness.

9. In an apparatus for producing a sheet of plastic material having a substantially constant average thickness including:

an extruder means comprising: a generally circular die means having a plurality of adjustable profile forming sections spaced therearound, means in said circular die means for receiving said raw plastic material at an adjustable rate under pressure and extruding a continuous generally tubular length of said plastic material, means for blowing air through said circular die means to expand said tubular length of plastic material into a bubble, and means for flattening said bubble of plastic material into a sheet of double thickness;

means for rotating at least one component of said extruder means to distribute the thickness variations in said plastic material about the circumference of the tubular length thereof, the output of each adjustable profile forming section forming a longitudinally extending spiraling zone with each zone overlapping itself at the edges of the flattened sheet to form individual double thickness areas which pass a predetermined fixed position adjacent one edge of the sheet as the sheet is extruded, the improvement comprising:

gauge means overlying said predetermined fixed position and immediately adjacent said one edge of said flattened double thickness sheet for measuring the double thickness dimension thereof;

means for averaging the output of said gauge means for a time period sufficient to include the thickness variations over the entire circumference of said sheet; and means for displaying said average value of the thickness dimension of said double thickness sheet at said edge as an indication of the average value of the single thickness profile of said sheet to enable adjustments to be made in the average sheet thickness produced by said extruder means.

10. The apparatus as defined in claim 9 wherein said means for averaging the output of said gauge means averages for a time period substantially equal to one revolution of said extruder component.

11. The apparatus as defined in claim 9 wherein said gauge means measuring the double thickness dimension of said sheet comprises a radiation gauge.

12. In an apparatus for producing a sheet of plastic material having a substantially constant profile of the type including:

an extruder means comprising: a generally circular die means having a plurality of adjustable peripheral die sections spaced therearound, means in said circular die means for receiving raw plastic material under pressure and extruding a continuous generally tubular length of said plastic material, means for blowing air through said circular die means to expand said tubular length of said plastic material into a bubble, means for flattening said bubble of plastic material into a sheet of double thickness; and means for rotating at least one component of said extruder means to distribute the thickness variations in said plastic material about the circumference of the tubular length thereof, the output of each adjustable peripheral die section forming a longitudinally extending spiraling zone with each zone overlapping itself at the edges of the flattened sheet to form individual double thickness areas passing a predetermined fixed position adjacent one edge of the sheet as the sheet is extruded, the improvement comprising:

gauge means positioned immediately adjacent said one edge of the sheet and in overlying relation with said predetermined fixed position to provide a measurement of the double thickness dimension of each of said passing individual areas; and means for displaying said gauge measurement as a direct indication of the single thickness profile of said sheet of plastic material whereby adjustments of the plurality of peripheral die sections in said circular die means may be made to maintain single thickness profile of said plastic sheet within predetermined limits.

13. The apparatus as defined in claim 12 wherein said means to provide a measurement of the double sheet thickness dimension comprises a radiation gauge.

14. The apparatus as defined in claim 12 further including averaging means responsive to said gauge means for averaging the measurement from said gauge means over a time period sufficient that the average thickness of the entire circumference of the sheet is obtained.

15. The apparatus as defined in claim 14 wherein said averaging means responsive to said gauge means averages for a time period substantially equal to one revolution of said extruder component.

16. Apparatus for measuring the thickness of a tubular product formed by a device that can produce spiral variations about the circumference of said tubular product, and flattened to form a sheet of double thickness, said apparatus comprising:

means positioned at one edge of said sheet for measuring the variations in total sheet thickness at said edge to obtain the single thickness profile of said tubular product, and
means for averaging said measured single thickness profile.

17. Apparatus for measuring the output of a blown film extrusion process wherein an extruder having a rotatable forming member provides an expanded tubular product and wherein said product is flattened into a sheet of double thickness by pinch roll means, said apparatus comprising:

gauge means positioned at one edge of said flattened sheet for measuring the variations in the total thickness of said sheet at said edge to obtain the single thickness profile of said tubular product,
means for indicating said measured single thickness profile, and means for averaging said measured single thickness profile.

18. Apparatus for measuring the thickness of a tubular product formed by a device that can produce spiral variations about the circumference of said tubular product, and flattened to form a sheet of double thickness, said apparatus comprising:

means positioned at one edge of said sheet for measuring the variations in total sheet thickness at said edge to obtain the single thickness profile of said tubular product, and means for indicating said measured single thickness profile.

References Cited

UNITED STATES PATENTS

| | | | |
|---|---|---|---|
| 2,844,846 | 7/1958 | Kronholm | 18—145 |
| 3,007,052 | 10/1961 | Hickman et al. | |
| 3,015,129 | 1/1962 | Hays et al. | 18—2 X |
| 3,020,588 | 2/1962 | Ferguson et al. | 18—14 X |
| 3,079,636 | 3/1963 | Aykanian | 18—14 |
| 3,084,314 | 4/1963 | Ziffer. | |
| 3,122,784 | 3/1964 | Joliffe | 18—21 |
| 3,161,942 | 12/1964 | Cheney | 18—145 X |

WILLIAM J. STEPHENSON, *Primary Examiner.*